United States Patent
Brullo et al.

(10) Patent No.: US 10,245,998 B2
(45) Date of Patent: Apr. 2, 2019

(54) LOAD RESTRAINING APPARATUS AND METHOD

(71) Applicants: John Brullo, Somerton (AU); Anthony Bourne, Campbellfield (AU)

(72) Inventors: John Brullo, Somerton (AU); Anthony Bourne, Campbellfield (AU)

(73) Assignee: GREAT AUSSIE IDEAS PTY LTD, Campbellfield, Victoria (AU)

( * ) Notice: Subject to any disclaimer, the term of this patent is extended or adjusted under 35 U.S.C. 154(b) by 0 days.

(21) Appl. No.: 14/533,717

(22) Filed: Nov. 5, 2014

(65) Prior Publication Data

US 2015/0056038 A1    Feb. 26, 2015

Related U.S. Application Data

(63) Continuation of application No. 12/448,741, filed as application No. PCT/AU2008/000006 on Jan. 4, 2008, now abandoned.

(30) Foreign Application Priority Data

Jan. 4, 2007    (AU) ................ 2007900028

(51) Int. Cl.

| | | |
|---|---|---|
| *B60P 7/06* | (2006.01) | |
| *B60P 7/08* | (2006.01) | |
| *F16G 11/14* | (2006.01) | |
| *B65D 63/16* | (2006.01) | |

(52) U.S. Cl.
CPC .............. *B60P 7/06* (2013.01); *B60P 7/0823* (2013.01); *B65D 63/16* (2013.01); *F16G 11/143* (2013.01); *Y10T 24/3916* (2015.01); *Y10T 24/47* (2015.01); *Y10T 24/4755* (2015.01)

(58) Field of Classification Search
CPC ........ B60P 7/0823; B60P 7/06; F16G 11/143; F16G 11/14; Y10T 24/47; Y10T 24/3916; Y10T 24/4755; Y10T 24/2164; Y10T 24/4047; Y10T 24/4093; Y10T 24/4736; Y10T 24/3918; Y10T 24/4088; Y10T 24/406; B65D 63/16; A41C 3/0071; A41C 3/12

See application file for complete search history.

(56) References Cited

U.S. PATENT DOCUMENTS

| | | | |
|---|---|---|---|
| 95,854 A | 10/1869 | Tildesley | |
| 479,509 A | 7/1892 | Heaphy | |
| 1,418,743 A | 6/1922 | Stout | |
| 1,485,996 A | 3/1924 | Stout | |
| 1,643,183 A | 9/1927 | Smith | |
| 2,212,862 A * | 8/1940 | Hirsh | A44B 11/04 2/268 |
| 2,849,773 A * | 9/1958 | Kaselow | A41F 9/025 2/221 |
| 2,967,340 A | 1/1961 | Pernecky, Jr. | |

(Continued)

FOREIGN PATENT DOCUMENTS

FR    2318750    2/1977

*Primary Examiner* — Robert Sandy
*Assistant Examiner* — Michael S Lee
(74) *Attorney, Agent, or Firm* — K&L Gates LLP (57) ABSTRACT

A load (22, 26, 27, 28, 29) is restrained against movement by passing a tape or chain (21, 31, 39) around the load (22, 26, 27, 28, 29) and passing the tape or chain (21, 31, 39) through a slot (17, 44) in a plate or the like (14, 41).

8 Claims, 9 Drawing Sheets

(56) References Cited

U.S. PATENT DOCUMENTS

| | | | | |
|---|---|---|---|---|
| 3,447,208 | A | * | 6/1969 | Beach .................. B65D 63/16 |
| | | | | 24/23 B |
| 3,499,193 | A | | 3/1970 | Hatfield |
| 4,910,834 | A | | 3/1990 | Minkler |
| 5,343,912 | A | | 9/1994 | Chronister et al. |
| 5,535,796 | A | | 7/1996 | Line et al. |
| 5,662,133 | A | * | 9/1997 | Guido, Jr. ............... E04H 15/64 |
| | | | | 135/119 |
| 5,950,284 | A | | 9/1999 | Persson |
| 8,668,551 | B1 | * | 3/2014 | Folino .................... A41F 1/006 |
| | | | | 2/338 |
| 2005/0257348 | A1 | | 11/2005 | Byers |
| 2006/0048346 | A1 | * | 3/2006 | Soumi ................... H02G 11/00 |
| | | | | 24/115 R |
| 2009/0075562 | A1 | * | 3/2009 | Lung .................... A41C 3/0071 |
| | | | | 450/58 |
| 2010/0139053 | A1 | | 6/2010 | Brullo |

\* cited by examiner

Figure 9

LOAD RESTRAINING APPARATUS AND METHOD

CROSS-REFERENCE TO RELATED APPLICATIONS

The present application is a continuation application claiming priority to co-pending U.S. patent application Ser. No. 12/448,741, filed Jan. 26, 2010, which application is related to and claims the benefit of priority to International Application PCT/AU2008/000006, filed Jan. 4, 2008 which claims priority under 35 U.S.C. §§ 119 or 365(c) to Australian Patent Application No. 2007900028, filed Jan. 4, 2007. Each of the forgoing applications is hereby incorporated by reference in its entirety into the present application.

FIELD OF THE INVENTION

The present invention relates to apparatus and to methods for restraining objects such as loads, particularly during transportation.

BACKGROUND OF THE INVENTION

In the present art, flexible tape, cord, rope, chain or the like is used to tie down loads. Accordingly, throughout this specification (including the claims) we use the term "tape" to include flexible tape, cord, rope, chain and the like that is suitable for tying loads and the like.

Figure 1:
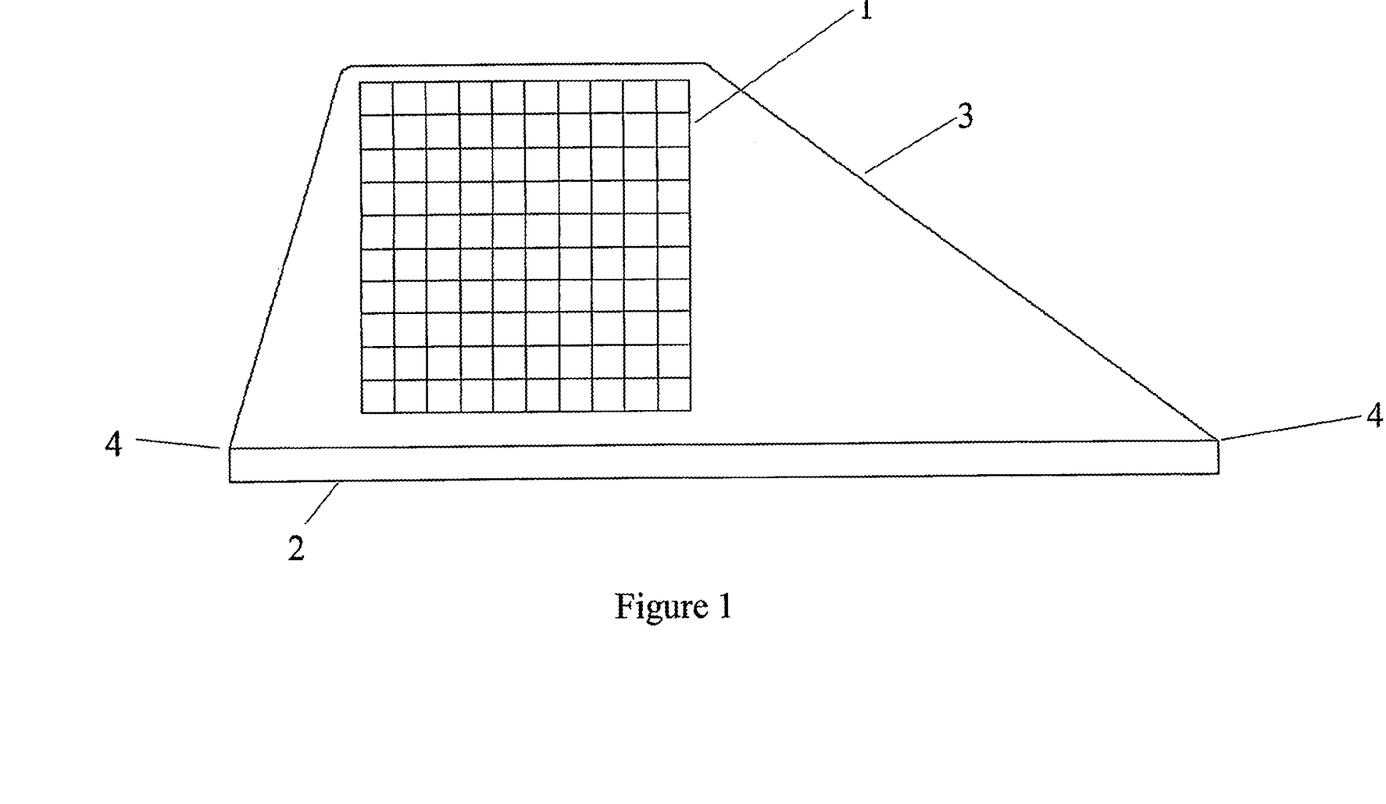
FIGS. 1 and 2 illustrate methods and apparatus by which loads are customarily currently constrained during transport.
Figure 2:
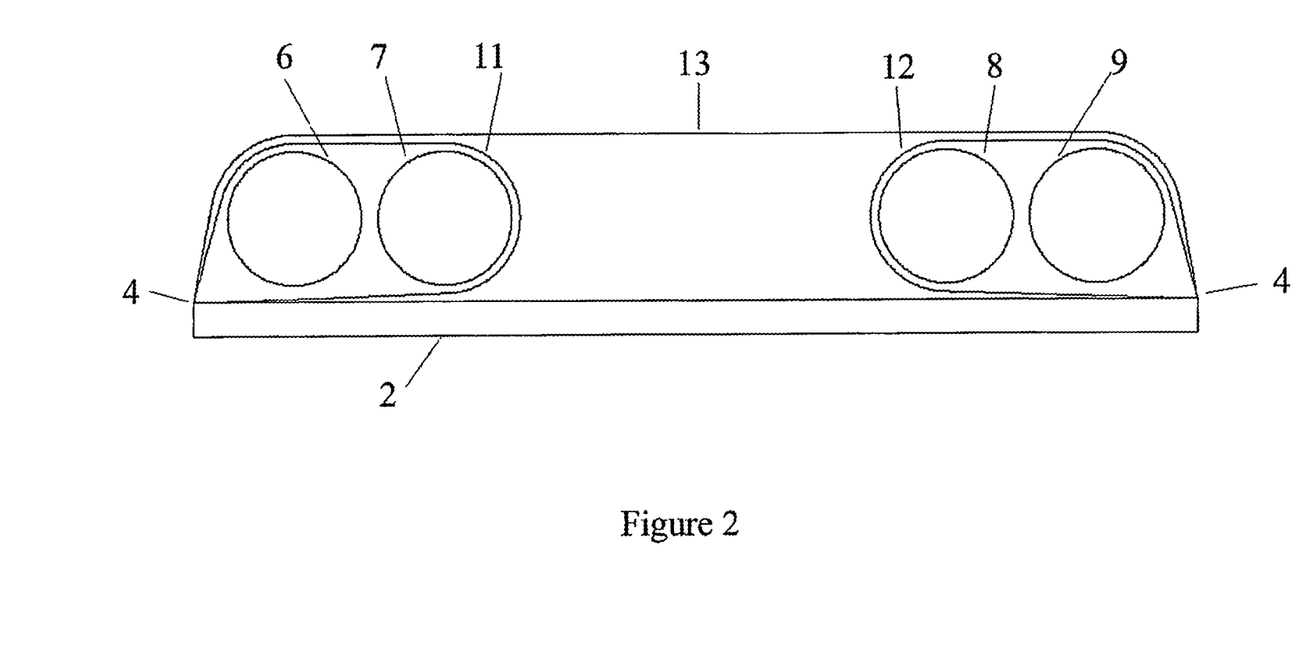

FIGS. 1 and 2 illustrate methods and apparatus by which loads are currently restrained during transport.

FIG. 1 is a cross-sectional view through a load 1 that is being carried on a flat-bed 2 of a transportation vehicle. The load 1 is being restrained against movement by a restraint 3. In the drawing, the direction normal to the plane of the paper is the fore-and-aft direction of the vehicle and so also of movement of the vehicle. The restraint 3 is generally either tape or the like formed from synthetic material, or chain. The restraint 3 is anchored at opposite anchor points 4 at extremities of the flat-bed 2 and stretched taut over the load 1 in an attempt to restrain that load both laterally and longitudinally. It will however be appreciated that, depending on, among other things:

the mass of the load 1;
the amount of friction between the load 1 and the flat-bed 2; and
the amount of friction between the load 1 and the restraint 3, the load 1 may be prone to fore-and-aft movement on acceleration or braking of the vehicle and to sideways sway on cornering.

FIG. 2 is a cross-sectional view through loads 6, 7, 8 and 9 that similarly are being carried on a flat-bed 2 of a transportation vehicle and which are being similarly restrained. In this case, to more reliably secure the loads 6, 7, 8 and 9, three restraints 11, 12 and 13 are used. The restraints 11, 12 and 13 are tape, chain or the like. The restraint 11 is anchored at point 4 at one edge of the flat-bed 2 and passes once around the adjacent load items 6 and 7. Similarly, the restraint 12 is anchored at the opposite point 4 of the flat-bed 2 and passes once around the adjacent load items 8 and 9. It will be appreciated that the restraints 11 and 12 operate to restrain load items 6, 7, 8 and 9 from moving towards the centre-line of the flat-bed 2 as well as (to some extent) contributing to preventing fore-and-aft movement of the load items 6, 7, 8 and 9. To more effectively restrain the load items 6, 7, 8 and 9 in general and to prevent their movement towards lateral edges of the flat-bed 2, a further restraint 13 is anchored at points 4 and passes over each of those load items. It will be appreciated that the restraint 13 can be secured in place only after the items 6, 7, 8 and 9 have been placed on the flat-bed 2. It will also be appreciated that, in the situation where various ones of load items 6, 7, 8 and 9 are to be delivered to different locations, it will be necessary to release and re-fix at least two of the restraints 11, 12 and 13 at at least one of those delivery locations.

SUMMARY OF THE INVENTION

In contrast, according to one embodiment, the present invention provides apparatus for restraining an object when used in conjunction tape, the apparatus comprising:
a body; the body comprising:
two sides and a periphery;
a first opening passing through the body;
a second opening passing from the periphery of the body and being in communication with the first opening
the second opening being adapted to receive a bight of the tape for movement of that bight into the first opening; and
the first opening being adapted to receive that bight of the tape in a manner in which the bight protrudes to one side of the body and the remainder of the tape protrudes to the other side of the body.

In one preferred form, the two sides are substantially planar, in which case it is also preferred that the first opening and the second opening together define a slot.

In another preferred form the body comprises substantially two hook-shaped components, each hook-shaped component having a first arm and a second arm, each first arm being contiguous with the other first arm and the two hook-shaped components defining the first and second openings between them.

In another preferred form, the present invention provides a process of restraining an object by using such apparatus, the process comprising:
arranging tape so that a bight of the tape protrudes to one side of the body and the remainder of the tape protrudes to the other side of the body; and
restraining the object within that bight of tape.

BRIEF DESCRIPTION OF THE DRAWING

In order that the invention may be more readily understood, preferred embodiments of the invention are described with reference to the accompanying drawings in which.

DESCRIPTION OF PREFERRED EMBODIMENTS OF THE INVENTION

Figure 3:
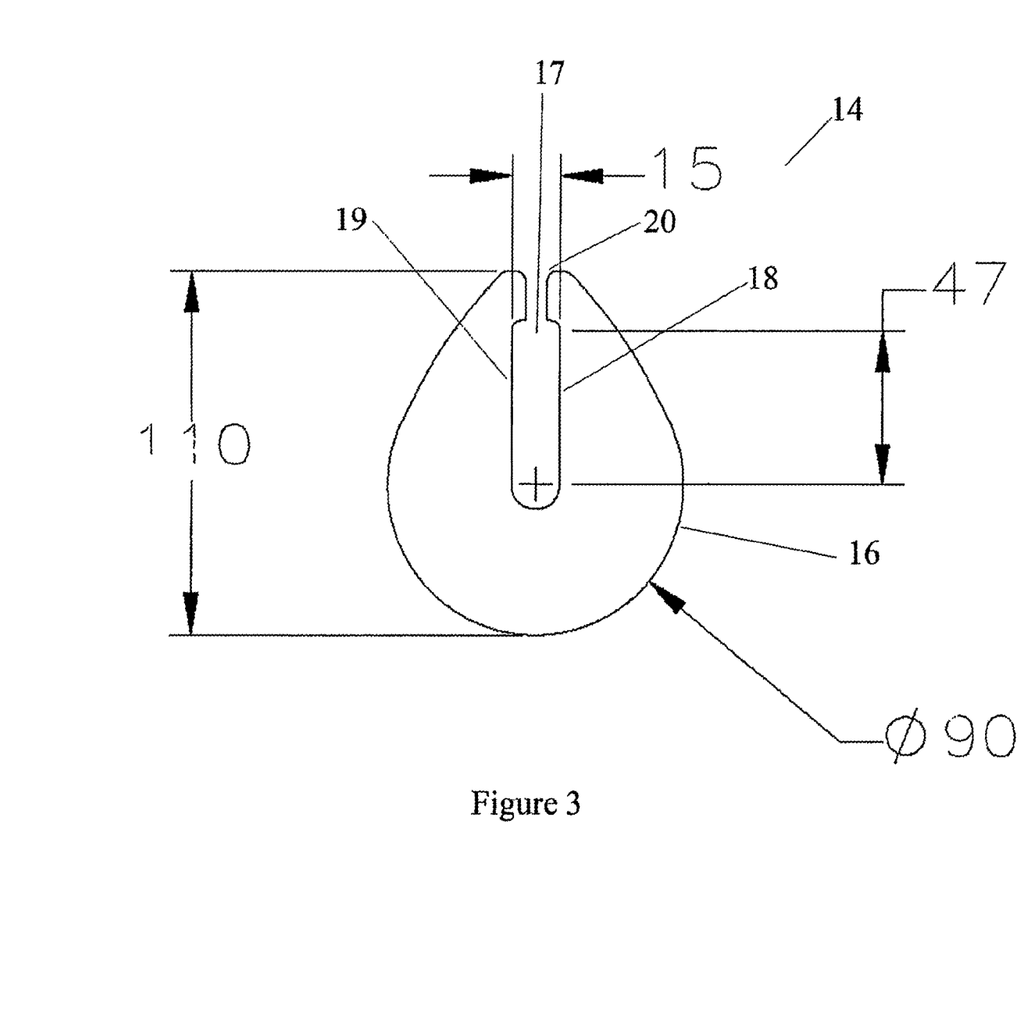
FIG. 3 illustrates apparatus according to one preferred embodiment of the present invention.

FIG. 3 is a plan view of apparatus 14 according to one preferred embodiment of the present invention. The apparatus 14 is a plate 16 which has a slot 17 in it. The plate is manufactured from any suitable material, but forged steel is preferred. The slot 17 has opposed, substantially parallel edges 18 and 19 and has an open end 20. Although the peripheral outline of the plate 16 is shown as being generally tear-drop shaped (in the plan view) the peripheral shape of the plate 16 is not critical to the invention.

Figure 4:
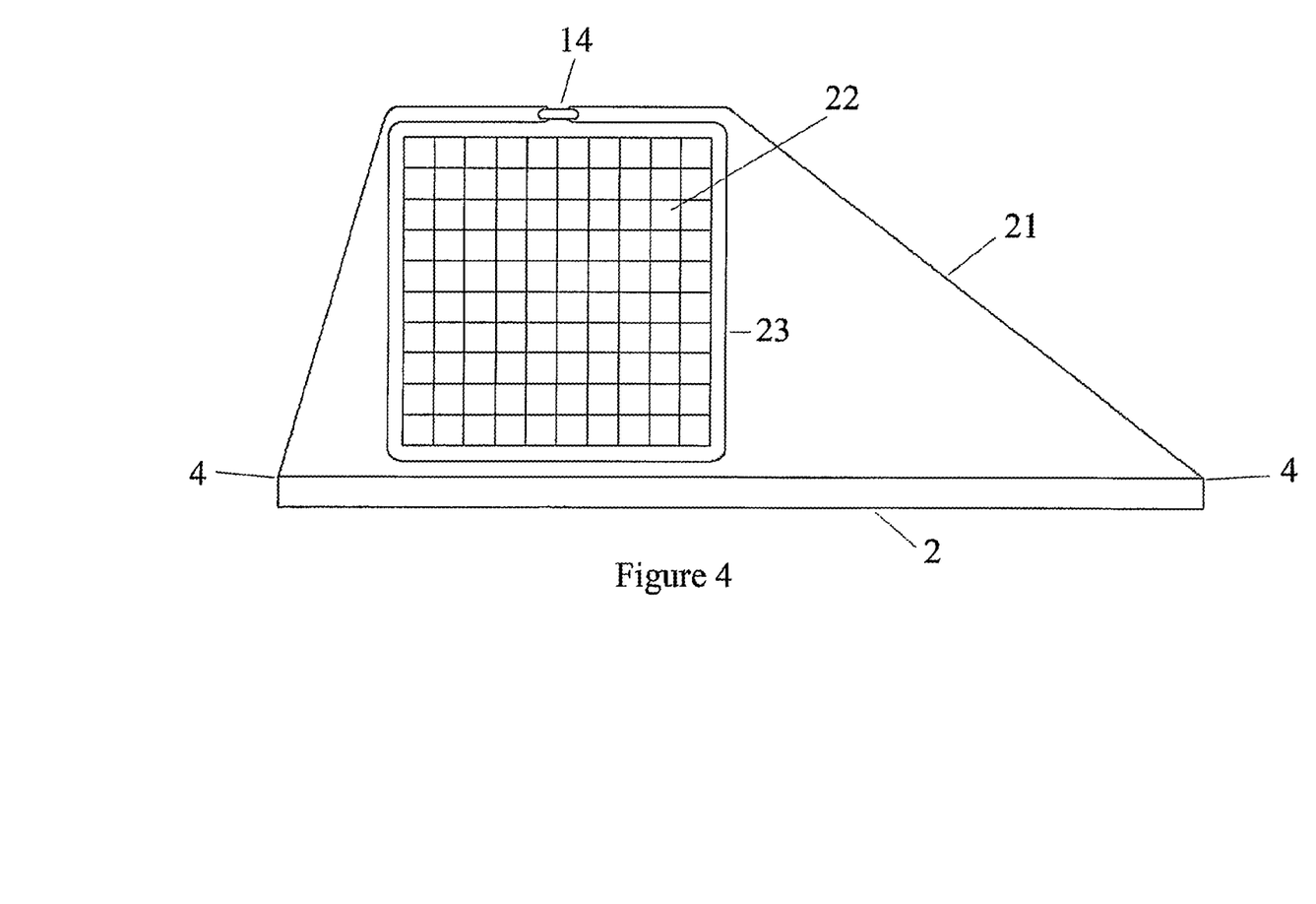
FIGS. 4, 5 and 6 illustrate methods according to preferred embodiments.
Figure 5:
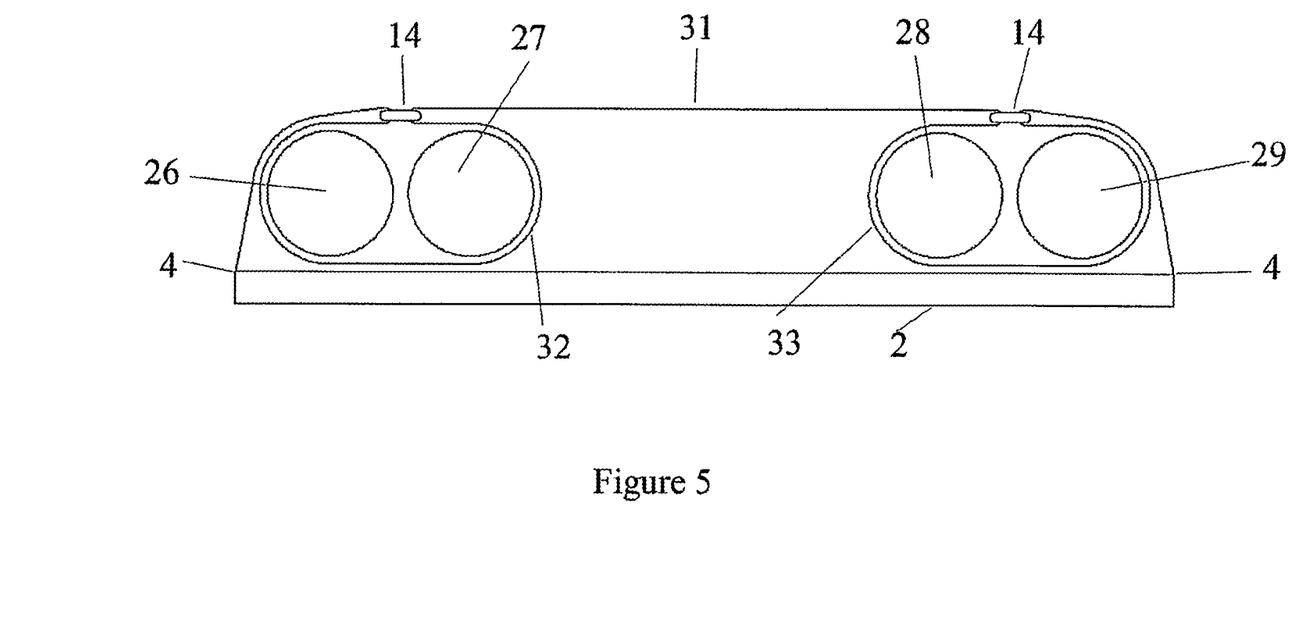

A preferred process of using the apparatus 14 of FIG. 3 is illustrated in FIGS. 4 and 5. This process uses a restraint 21 in the form of tape formed from synthetic material. The restraint 21 is left lying loosely across the flat-bed 2 and the load 22 is then placed on the flat-bed 2 and on top of the loose tape 21. A bight 23 of the restraint 21 is then placed around the load 22 and placed into the slot 17 by passing it through the open end 20 of the slot 17 in a plate 14. The restraint 21 is then tightened and fastened at points 4 at opposite sides of the flat-bed 2.

FIG. 5 differs from FIG. 4 in that it illustrates multiple load items 26, 27, 28 and 29. Again, a restraint such as 31 is left lying loosely across the flat-bed 2 and the load items 26, 27, 28 and 29 are then placed on the flat-bed 2 and on top of the loose tape 31. A bight 32 of the restraint 31 is then placed around the load items 26 and 27 and placed into the slot 17 by passing it through the open end 20 of the slot in a plate 14. A bight 33 of the restraint 31 is then placed around the load items 28 and 29 and then placed into the slot 17 by passing it through the open end 20 of the slot in the plate 14. The restraint 31 is then tightened and fastened at points 4 at opposite sides of the flat-bed 2.

It will be appreciated that, in order to remove a single one of the load items 26, 27, 28 or 29 it is necessary only to manipulate one restraint, unlike the arrangement illustrated in FIG. 2.

Figure 6:
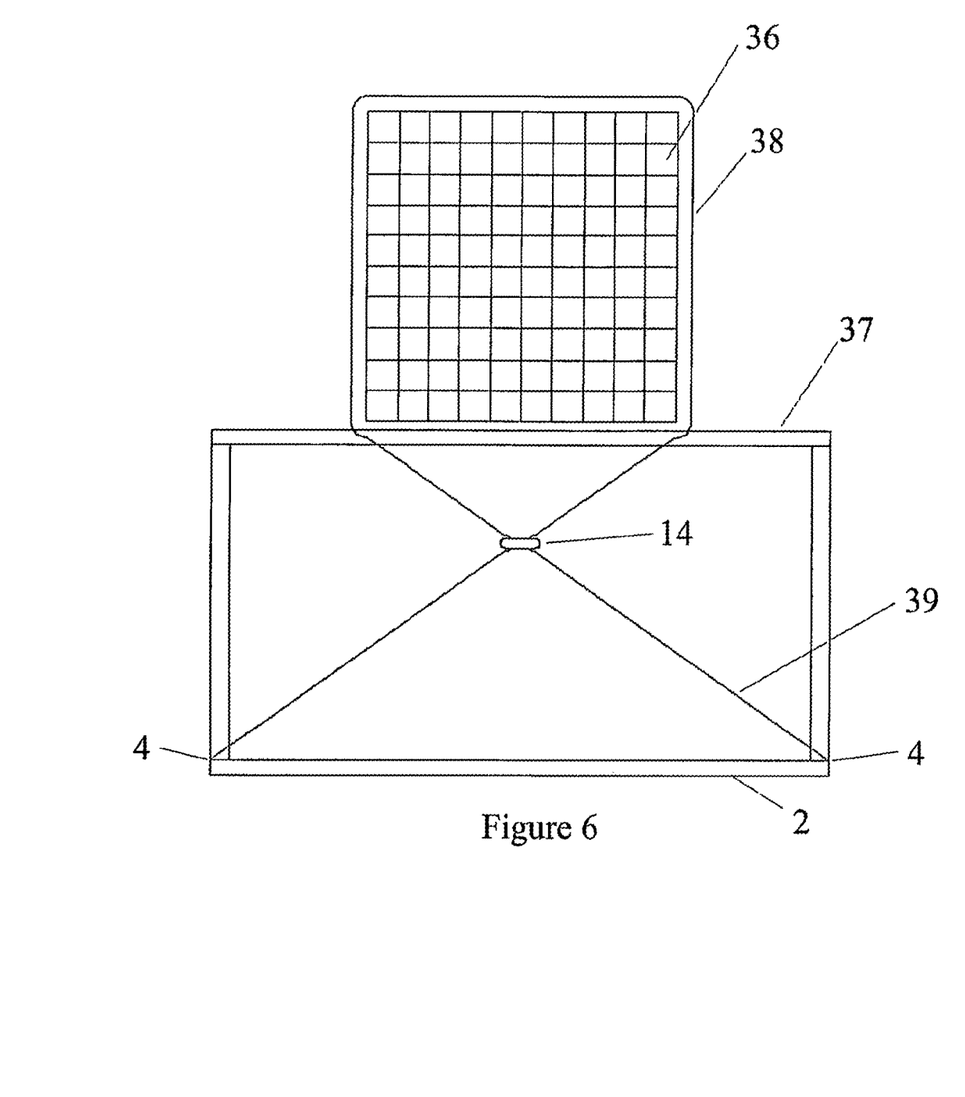

FIG. 6 illustrates a method according to another preferred embodiment of the present invention. A load item 36 is shown as stacked on, but protruding from, another load item 37. In a region where the item 36 protrudes from the item 37, a bight 38 of a restraint 39 passes around the item 36. Below the item 36, legs of the restraint 39 are placed into the slot 17 in the plate 14. The restraint 39 is tightened and fastened at points 4.

Figure 7:
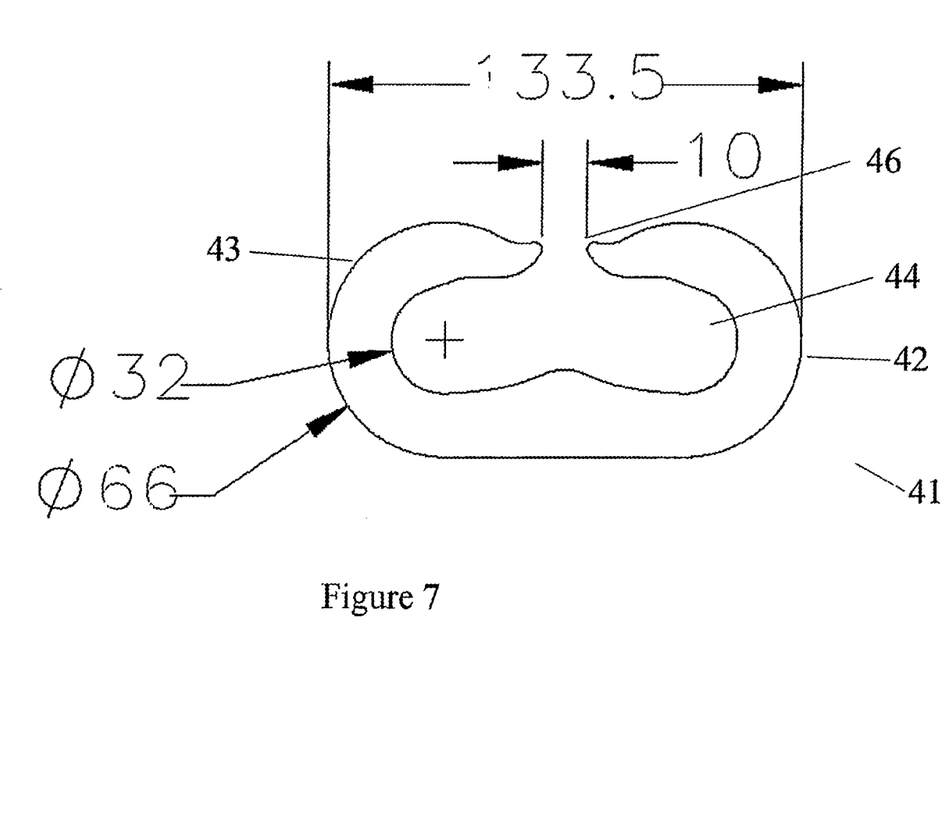
FIGS. 7, 8 and 9 illustrate apparatus according to another three preferred embodiments of the invention.

FIG. 7 is a plan view of apparatus 41 according to another preferred embodiment of the present invention. The embodiment of FIG. 7 is adapted for use with restraints that are in the form of a chain. The apparatus 41 has two opposed arms 42 and 43 defining a slot between them, having an opening 46 to the slot. The apparatus 41 operates in a way that is similar to the apparatus 14, in that legs of a restraint (which is not illustrated in FIG. 7) are passed into the slot 44 through the opening 46.

Figure 8:
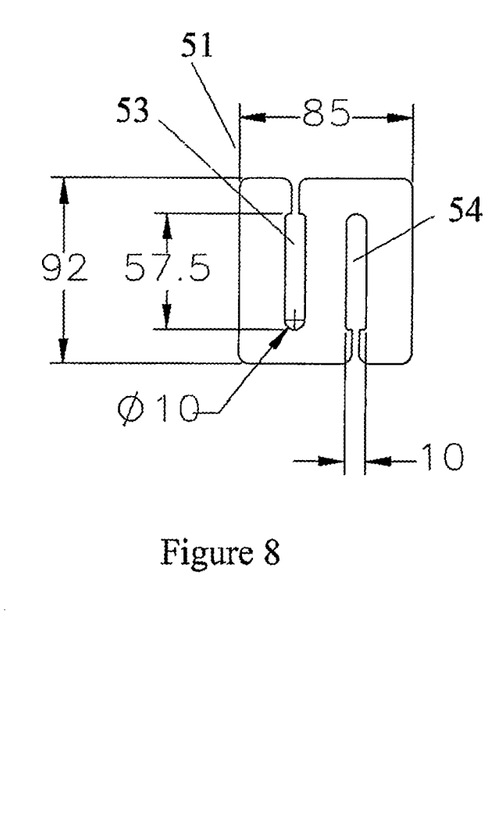

FIG. 8 is a plan view of apparatus according to another preferred embodiment of the invention. It will be apparent that the embodiment of FIG. 8 is similar to the embodiment of FIG. 3, except that the embodiment of FIG. 8 has two slots 53 and 54 whereas the embodiment of FIG. 3 has one slot 17. In use, the tape or the like is passed once through each slot 53 and 54 (contrasting with passing the tape twice through the slot 17 of FIG. 3).

Figure 9:
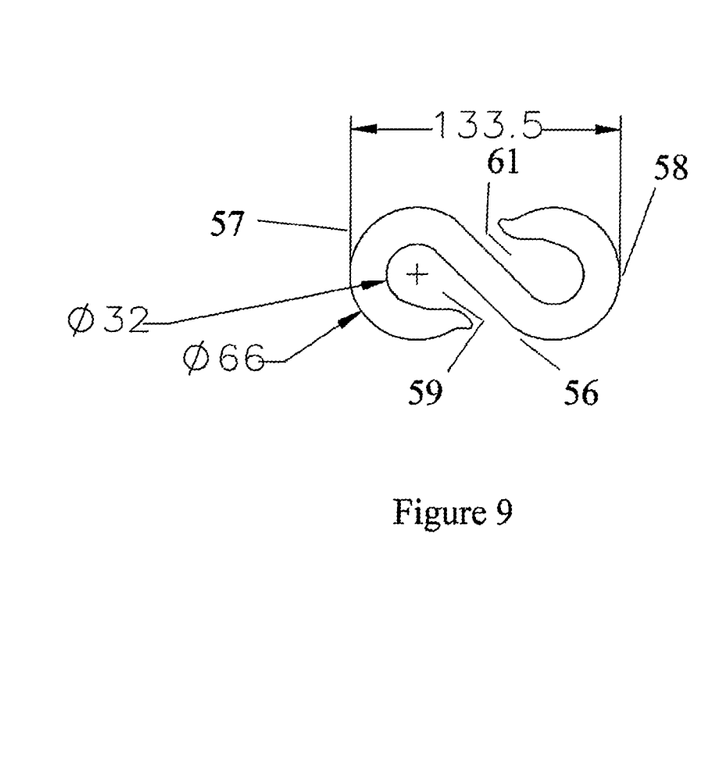

FIG. 9 is a plan view of apparatus according to another preferred embodiment of the invention. It will be apparent that the embodiment of FIG. 9 is similar to the embodiment of FIG. 7. The embodiment 56 of the invention shown in FIG. 9 has two opposed arms 57 and 58 defining two separate slots 59 and 61.

Figures 10, 11, 12:
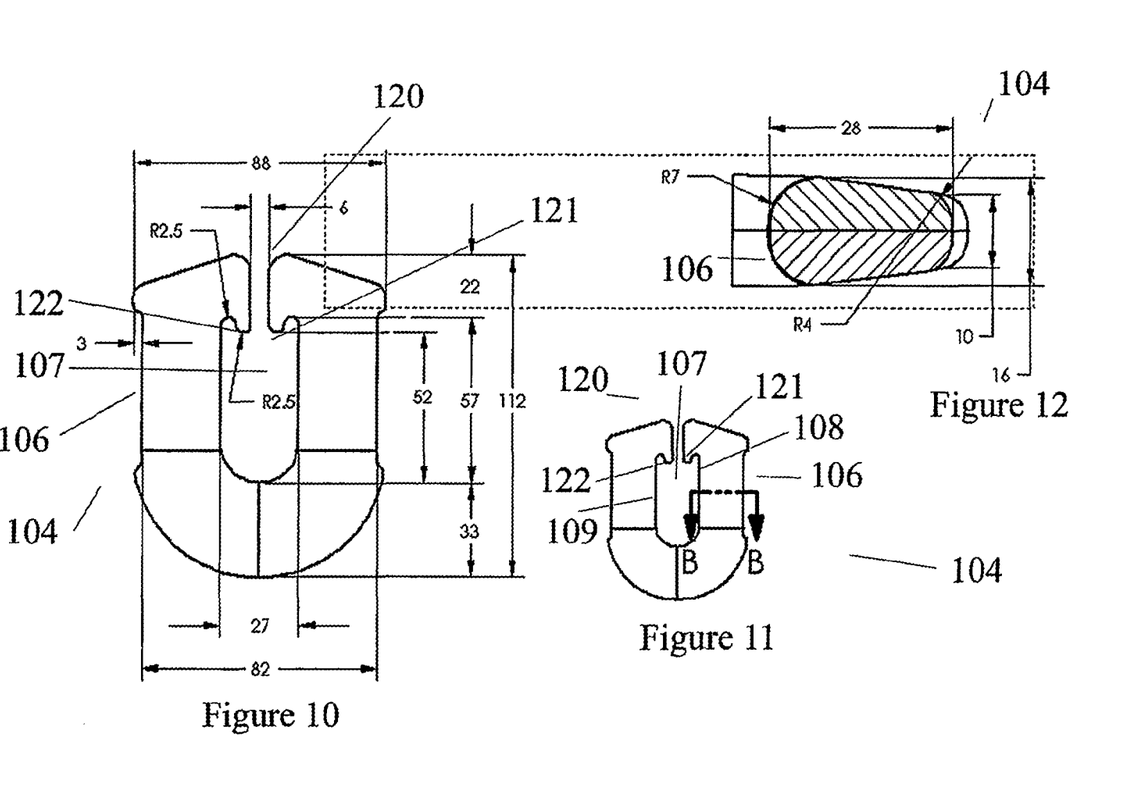
FIGS. 10 and 11 are plan views, on different scales, of yet another embodiment of the invention.
FIG. 12 is a cross-sectional view on the line B-B of FIG. 11.

FIGS. 10 and 11 are plan views of apparatus 104 according to yet another one preferred embodiment of the present invention. The apparatus 104 is a plate 106 which has a slot 107 in it. The plate is manufactured from any suitable material, but forged steel is preferred. The slot 107 has opposed, substantially parallel edges 108 and 109 and has an open end 120. Although the peripheral outline of the plate 106 is shown as having two opposite sides which appear generally straight and parallel to each other (in plan view) and an end which appears generally arcuate (in the plan view) the peripheral shape of the plate 106 is not critical to the invention.

It will also be seen that, proximate the open end of the slot 107, the plate 106 comprises integral protrusions 121 and 122 which project generally inwardly into the slot 107.

The embodiment of FIGS. 10 to 12 is particularly suited to situations in which a flat tape is being used. It will be appreciated that, when the tape is flat, an edge of the tape will bear against each of the protrusions 121 and 122, tending to more securely retain that tape within the slot 107.

Although the embodiments of the invention that have been described are particularly suited to industrial uses, other embodiments of the invention are particularly suited to non-industrial uses. For example, embodiments of apparatus according to the present invention are in smaller sizes particularly suited to restraining loads on car roof-racks, trailers or the like. Although forged steel has been described as being particularly suitable for the apparatus, it will be appreciated that any suitable material, such as synthetic plastics materials, may be used Synthetic plastics materials are particularly suitable for light-weight embodiments of the apparatus in some non-industrial environments.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Although dimensions are shown in FIGS. 3 and 7, it is to be appreciated that the scope of the invention is not specifically limited by those dimensions except to the extent described and claimed in this specification.

"Comprises/comprising" when used in this specification is taken to specify the presence of stated features, integers, steps or components but does not preclude the presence or addition of one or more other features, integers, steps, components or groups thereof.

The claims defining the invention are as follows:

1. An assembly for restraining a load, the assembly comprising an apparatus and a flat tape secured together, the apparatus comprising a U-shaped member consisting of a single pair of arms and a single open slot defined by the arms, wherein the single open slot is adapted to receive the flat tape and the flat tape is configured to form a bight that extends from the single open slot between the arms, wherein each arm ends in a hook that projects into the single open slot to prevent the flat tape from laterally slipping off the arms and exiting the single open slot, and wherein the bight is configured to be formed around the load, wherein the load comprises a first side and a distally positioned second side, and wherein the U-shaped member is positioned proximal to the first side and a first surface of a vehicle is positioned proximal to the second side.

2. A method for restraining a load, the method comprising securing the load on a vehicle using the assembly of claim 1.

3. The assembly of claim 1, wherein the pair of arms comprises a first arm and a second arm, wherein the bight is configured such that the flat tape contacts a first surface of the first arm within the single open slot and a second surface of the second arm within the single open slot.

4. The assembly of claim 3, wherein the bight is a continuous portion of the flat tape.

5. The assembly of claim 1, further comprising the bight configured to be tightened around the load.

6. The assembly of claim 1, wherein the bight is positioned around the entire load.

7. A method for restraining a load, the method comprising securing the load on a vehicle using an apparatus comprising a flat tape and a U-shaped member consisting of a single pair of arms and a single open slot defined by the arms, wherein the single open slot is adapted to receive the flat tape and the flat tape is configured to form a bight that extends from the single open slot between the arms, wherein each arm ends in a hook that projects into the single open slot to prevent the flat tape from laterally slipping off the arms and exiting the single open slot, and wherein the bight is configured to be formed around the load.

8. The method of claim 7, further comprising tightening the bight around the load.

\* \* \* \* \*